US012710984B2

(12) United States Patent
Mukherjee et al.

(10) Patent No.: US 12,710,984 B2
(45) Date of Patent: Aug. 18, 2026

(54) PROCESSOR POWER MANAGEMENT USING INSTRUCTION THROTTLING

(71) Applicant: SiFive, Inc., San Mateo, CA (US)

(72) Inventors: Shubhendu Sekhar Mukherjee, Southborough, MA (US); Andrew Waterman, Berkeley, CA (US)

(73) Assignee: SiFive, Inc., Santa Clara, CA (US)

( * ) Notice: Subject to any disclaimer, the term of this patent is extended or adjusted under 35 U.S.C. 154(b) by 765 days.

(21) Appl. No.: 17/863,826

(22) Filed: Jul. 13, 2022

(65) Prior Publication Data

US 2023/0019271 A1 Jan. 19, 2023

Related U.S. Application Data

(60) Provisional application No. 63/221,250, filed on Jul. 13, 2021.

(51) Int. Cl.

| | |
|---|---|
| ***G06F 9/48*** | (2006.01) |
| ***G06F 1/10*** | (2006.01) |
| ***G06F 1/3296*** | (2019.01) |
| ***G06F 9/30*** | (2018.01) |

(52) U.S. Cl.

CPC .............. *G06F 9/4893* (2013.01); *G06F 1/10* (2013.01); *G06F 1/3296* (2013.01); *G06F 9/30043* (2013.01)

(58) Field of Classification Search

CPC ........ G06F 9/4893; G06F 1/10; G06F 1/3296; G06F 9/30043; G06F 1/324; G06F 1/3243; G06F 1/329; G06F 9/30101; G06F 9/3836; G06F 1/28; Y02D 10/00

USPC .......................................................... 718/102

See application file for complete search history.

(56) References Cited

U.S. PATENT DOCUMENTS

| | | | | |
|---|---|---|---|---|
| 11,403,429 | B1 * | 8/2022 | Robinson | G06F 21/71 |
| 2003/0126478 | A1 * | 7/2003 | Burns | G06F 9/3869 712/E9.035 |
| 2006/0020831 | A1 * | 1/2006 | Golla | G06F 9/3854 712/E9.071 |
| 2006/0245275 | A1 * | 11/2006 | Naito | G11C 7/22 365/191 |
| 2007/0239937 | A1 * | 10/2007 | Gupte | G06F 12/0802 711/E12.017 |

(Continued)

FOREIGN PATENT DOCUMENTS

TW 202022529 A 6/2020

OTHER PUBLICATIONS

International Search Report and Written Opinion for Application No. PCT/US2022/033232, mailed Sep. 30, 2022, 13 pages.

(Continued)

*Primary Examiner* — Tuan C Dao

(74) *Attorney, Agent, or Firm* — Kilpatrick Townsend & Stockton LLP

(57) ABSTRACT

An integrated circuit comprises a processor core including a processor pipeline configured to execute instructions; a register configured to store a power dial value that indicates a portion of available clock cycles for throttling of instruction flow through the processor pipeline; and an instruction throttling circuit configured to periodically stall removal of instructions from a queue in the processor pipeline for a number of clock cycles that is determined based on the power dial value.

16 Claims, 7 Drawing Sheets

(56) References Cited

U.S. PATENT DOCUMENTS

| | | | | |
|---|---|---|---|---|
| 2008/0034236 | A1* | 2/2008 | Takayama | G06F 8/4432 713/322 |
| 2008/0104324 | A1* | 5/2008 | Raghuvanshi | G06F 12/0802 713/300 |
| 2008/0244278 | A1* | 10/2008 | Monferrer | G01R 31/52 374/45 |
| 2009/0210727 | A1* | 8/2009 | Bell, Jr. | G06F 1/206 713/320 |
| 2010/0005242 | A1* | 1/2010 | Cantin | G06F 12/0893 711/E12.017 |
| 2010/0005326 | A1* | 1/2010 | Archer | G06F 1/32 713/320 |
| 2011/0191508 | A1* | 8/2011 | Printezis | G06F 9/46 718/1 |
| 2013/0117596 | A1* | 5/2013 | Furukawa | G06F 11/3466 713/340 |
| 2017/0139716 | A1* | 5/2017 | Caulfield | G06F 9/3851 |
| 2020/0004587 | A1* | 1/2020 | Griffin | G06F 9/4856 |
| 2020/0363860 | A1 | 11/2020 | Ananthakrishnan et al. | |

OTHER PUBLICATIONS

Search Report for Application No. TW111122076, completed on Aug. 27, 2025, 1 page.

* cited by examiner

700

710

WRITE POWER DIAL VALUE TO REGISTER OF PROCESSOR CORE

715

CACHE MISS?

YES

NO

720

STALL REMOVAL OF INSTRUCTIONS FROM QUEUE IN PROCESSOR PIPELINE FOR A NUMBER OF CLOCK CYCLES THAT IS DETERMINED BASED ON THE POWER DIAL VALUE

730

CONTINUE REMOVAL OF INSTRUCTIONS FROM THE QUEUE FOR REMAINING CLOCK CYCLES IN A PERIOD OF CLOCK CYCLES

PROCESSOR POWER MANAGEMENT USING INSTRUCTION THROTTLING

CROSS-REFERENCE TO RELATED APPLICATION(S)

This application claims priority to and the benefit of U.S. Provisional Patent Application Ser. No. 63/221,250, filed Jul. 13, 2021, the entire disclosure of which is hereby incorporated by reference.

TECHNICAL FIELD

This disclosure relates to processor power management using instruction throttling.

BACKGROUND

Power consumption is tied to overall system-on-chip (SoC) performance including, but not limited to, battery life, energy consumption, thermal profile, cooling requirements, noise profile, system stability, sustainability, and operational costs. Power management techniques can be used to control power consumption by controlling the clock rate and by using voltage scaling, power gating, and other techniques.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
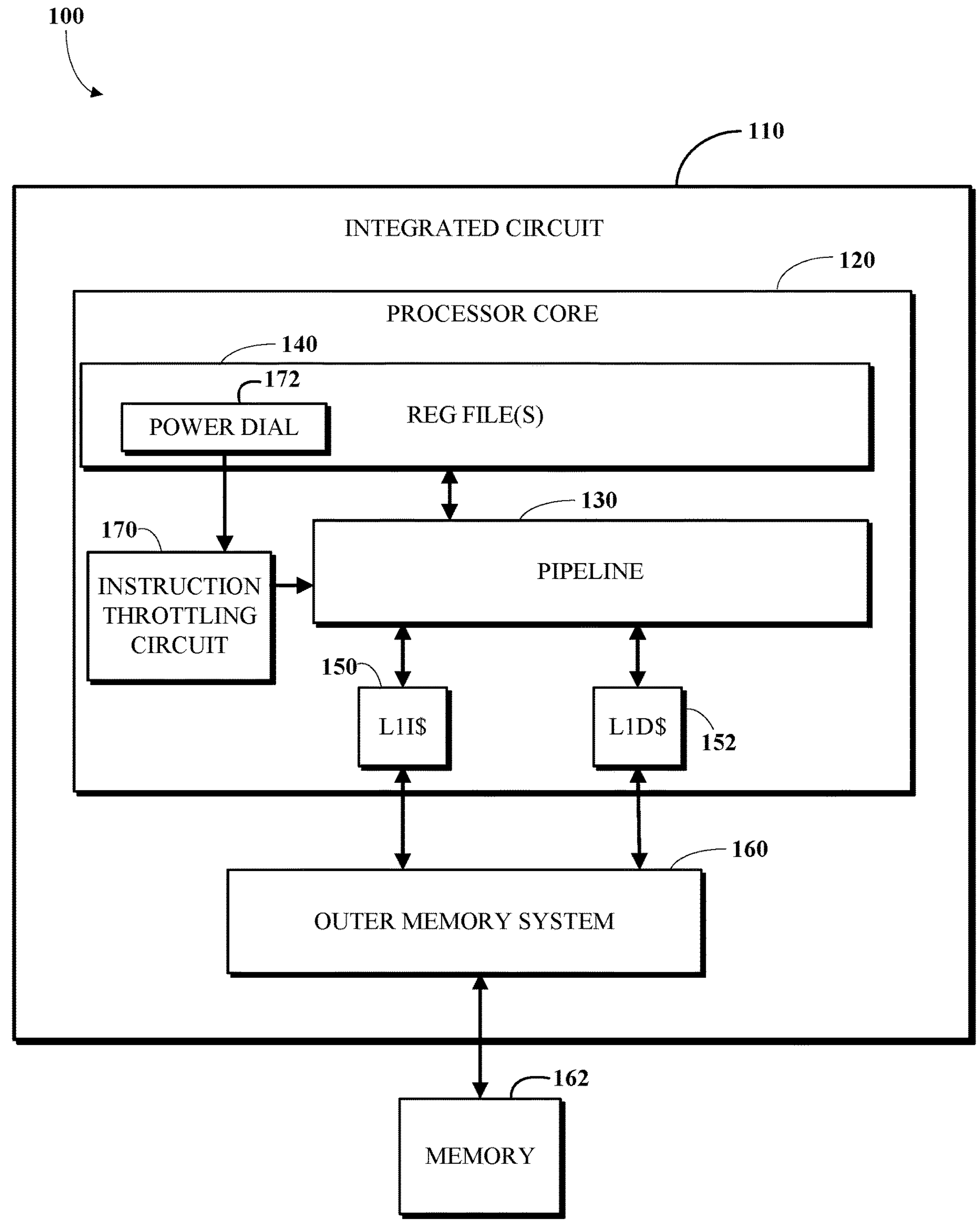
FIG. 1 is block diagram of an example of a system for executing instructions with processor power management using instruction throttling.

Disclosed herein are implementations of processor power management using instruction throttling. An integrated circuit (e.g., a processor or microcontroller) may be configured to throttle instruction flow through a processing pipeline in order to limit power consumption by a processor core including the processing pipeline. Instruction flow through the pipeline may be throttled by stalling instructions in a queue (e.g., a decode queue, an issue queue, or a retirement queue) of the processing pipeline. This stalling may create downstream bubbles of idleness in the processor pipeline that may reduce power consumption as the older instructions in the downstream stages of the processor pipeline are completed. This stalling may also cause the stalled queue to fill up and create idleness upstream in the processor pipeline as upstream stages backup with new instructions and have their queues fill in turn. This backup may reduce performance of the processor core that includes the processor pipeline.

There may be a trade-off between performance and power consumption when using instruction throttling to limit power consumption. A processor core may include a register that controls a level of instruction throttling that is applied to the processor core. Software may be used to write to this register to dynamically control the rate of stalling and manage this trade-off in response to changing conditions, such as, for example, based on workloads and usage of the processor core, based on a battery charge level indication, and/or based on user input.

A value written to this register may be referred to as a power dial value. For example, when the register is written to a non-zero value, the register may restrict peak instruction throughput to the indicated rate. For example, a value of zero may have no effect on instruction throughput. For example, the rate may be calculated as a number of clock cycles per period (e.g., a 128-cycle period or a 256-cycle period). For example, a power dial value of 1 may restrict instruction throughput at a common point in the pipeline to 240 cycles of each 256 cycle period. Reducing the peak rate may reduce the worst case power while minimizing the impact on performance. Power is a function of many variables including voltage, frequency, pipeline execution and data, therefore the instruction throttling controlled using the register may be combined with other techniques for power conservation as components of a power management solution.

In some implementations, better response time to dynamic control of power consumption using instruction throttling may be achieved as throttle logic is applied closer to end of a processor pipeline (e.g., in or close to a retirement or commit stage).

In some implementations, instruction flow through a processor pipeline may be throttled less directly by stalling data flow in a cache that is used by the processor pipeline to access memory and/or other resources. For example, instruction flow through the pipeline may be throttled by stalling update of miss status holding registers in a set of miss status holding registers of a level-one cache (e.g., an L1 data cache).

In some implementations, a power dial value that controls instruction throttling may be determined completely in hardware. For example, the power dial value stored in a register can be set based on a cache miss. For example, if we have a last-level cache miss, we can set the power dial value to 14 out of 15 (e.g., a generally high throttle). If we get an L1 cache miss, the throttle value can be set to a lower value, such as 2 out of 15. Similar logic may be used to determine a power dial value based on other events in a processor core, such as a translation lookaside buffer (TLB) miss.

In some implementations, a cache miss (e.g., at different cache levels) triggers the instruction throttling and consequent power dialing. A power dial register value may be set by software or hardware. However, the instruction throttling is not activated by the power dial value in the register alone. In this case, instruction throttling gets triggered only after a cache miss. The amount of throttling may be chosen by the power dial register thereafter. Normal execution, without instruction throttling, may be restored after the cache miss returns the data to the load instruction that caused the miss. This approach of applying instruction throttling contingent on a cache miss occurring may be generalized to other events in a processor core, such as a TLB miss.

Implementations described herein may provide advantages over conventional processor architectures, such as, for example, enabling dynamic adjustment of a limit on power consumption and/or conservation of power consumption.

These and other aspects of the present disclosure are disclosed in the following detailed description, the appended claims, and the accompanying figures.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Details

FIG. 1 is block diagram of an example of a system 100 for executing instructions with processor power management using instruction throttling. The system 100 includes an integrated circuit 110 (e.g., a processor or microcontroller) for executing instructions. The integrated circuit 110 includes a processor core 120 including a processor pipeline 130 configured to execute instructions. The processor core 120 includes one or more register files 140 that include a register 172 configured to store a power dial value that indicates a portion of available clock cycles for throttling of instruction flow through the processor pipeline 130. The processor core 120 includes an L1 instruction cache 150 and an L1 data cache 152. The integrated circuit 110 includes an outer memory system 160, which may include memory storing instructions and data and/or provide access to a memory 162 external to the integrated circuit 110 that stores instructions and/or data. The processor core 120 includes an instruction throttling circuit 170, which may be configured to periodically stall removal of instructions from a queue in the processor pipeline 130 for a number of clock cycles that is determined based on the power dial value. The integrated circuit 110 may provide advantages over conventional processor architectures, such as, for example, enabling dynamic adjustment of a limit on power consumption and/or conservation of power consumption. For example, the integrated circuit 110 may implement the technique 400 of FIG. 4.

The integrated circuit 110 includes a processor core 120 including a processor pipeline 130 configured to execute instructions. The processor pipeline 130 may include one or more fetch stages that are configured to retrieve instructions from a memory system of the integrated circuit 110. For example, the processor pipeline 130 may fetch instructions via the L1 instruction cache 150. For example, the processor pipeline 130 may include the processor pipeline 300 of FIG. 3. The processor pipeline 130 may include additional stages, such as decode, rename, dispatch, issue, execute, memory access, and write-back stages. For example, the processor pipeline 130 may be configured to execute instructions of a RISC V instruction set.

The integrated circuit 110 includes a register 172 configured to store a power dial value that indicates a portion of available clock cycles for throttling of instruction flow through the processor pipeline 130. In this example, the register 172 is part of a register file 140 in the processor core 120. For example, the register 172 may have write access limited to processes of a certain privilege mode (e.g., a machine mode). When written to a non-zero value, the register 172 may restrict peak instruction throughput to an indicated rate. For example, the register 172 may include a bit field of four bits (e.g., bits 3:0, with bits 31:4 reserved) that indicates a portion (e.g., n/16, where n is the value written to the register 172) of available clock cycles for throttling of instruction flow through the processor pipeline 130. For example, a value of 0 has no effect on instruction throughput. In some implementations, the rate may be calculated in terms of a portion clock cycles per period of time (e.g., per 256-cycle period). For example, a power dial value of 1 may restrict instruction throughput at a common point (e.g., a stall point) in the processor pipeline 130 to 240 cycles of each 256-cycle period by stalling instruction flow during 16 cycles of each 256-cycle period.

The integrated circuit 110 includes an L1 instruction cache 150 for the processor core 120. The L1 instruction cache 150 may be a set-associative cache for instruction memory. To avoid the long latency of reading a tag array and a data array in series, and the high power of reading the arrays in parallel, a way predictor may be used. The way predictor may be accessed in an early fetch stage and the hit way may be encoded into the read index of the data array. The tag array may be accessed in later fetch stage and is only used for verifying the way predictor.

The integrated circuit 110 includes an L1 data cache 152 for the processor core 120. For example, the L1 data cache 152 may be a set-associative VIPT cache, meaning that it is indexed purely with virtual address bits VA[set] and tagged fully with all translate physical address bits PA[msb:12]. For low power consumption, the tag and data arrays may be looked up in serial so that at most a single data SRAM way is accessed. For example, the line size of the L1 data cache 152 may be 64 Bytes, and the beat size may be 16 Bytes.

The integrated circuit 110 includes an outer memory system 160, which may include memory storing instructions and data and/or provide access to a memory 162 external to the integrated circuit that stores instructions and/or data. For example, the outer memory system 160 may include an L2 cache, which may be configured to implement a cache coherency protocol/policy to maintain cache coherency across multiple L1 caches. Although not shown in FIG. 1, the integrated circuit 110 may include multiple processor cores in some implementations. For example, the outer memory system 160 may include multiple layers.

The integrated circuit 110 includes an instruction throttling circuit 170 configured to periodically stall removal of instructions from a queue in the processor pipeline 130 for a number of clock cycles that is determined based on the power dial value, which is stored in the register 172. The queue may correspond to one of various potential stall points in the processor pipeline 130. For example, the queue may be a fetch queue in a fetch stage of the processor pipeline 130. For example, the queue may be a decode queue in a decode stage of the processor pipeline 130. For example, the queue may be a dispatch queue in a dispatch stage of the processor pipeline 130. For example, the queue may be an issue queue in an issue stage of the processor pipeline 130. For example, the queue may be in a load-store unit of an execution stage of the processor pipeline 130. For example, the queue may be a retirement queue (e.g., a commit buffer or a reorder buffer) in a retire stage of the processor pipeline 130. In some implementations, better response time to dynamic control of power consumption using instruction throttling may be achieved as throttle logic is applied closer to end of the processor pipeline 130 (e.g., in an issue stage or in a retirement stage). In some implementations, the instruction throttling circuit 170 may be part of the processor pipeline 130. In some implementations, the number of clock cycles may be determined as a portion clock cycles per period of time (e.g., per 256-cycle period). For example, a power dial value of 3, where the register 172 is configured to store a five bit power dial value, may restrict instruction throughput at the output of the queue in the processor pipeline 130 to 232 cycles of each 256-cycle period by stalling instruction flow during 24 cycles (i.e., 256*3/(2^5)) of each 256-cycle period. For example, stalling removal of instructions from a queue in the processor pipeline 130 may include disabling processing in a stage of the processor pipeline 130 that draws instructions from the queue. Reducing the peak rate of instruction throughput in the processor pipeline 130 may reduce the worst case power consumption while minimizing the impact on performance. Power is a function of many variables including voltage, frequency, pipeline execution and data, therefore the instruction throttling controlled by the register 172 may be combined with other mechanisms (e.g., clock rate adjustment and/or voltage level adjustment) as elements of a power management solution.

Figure 2:
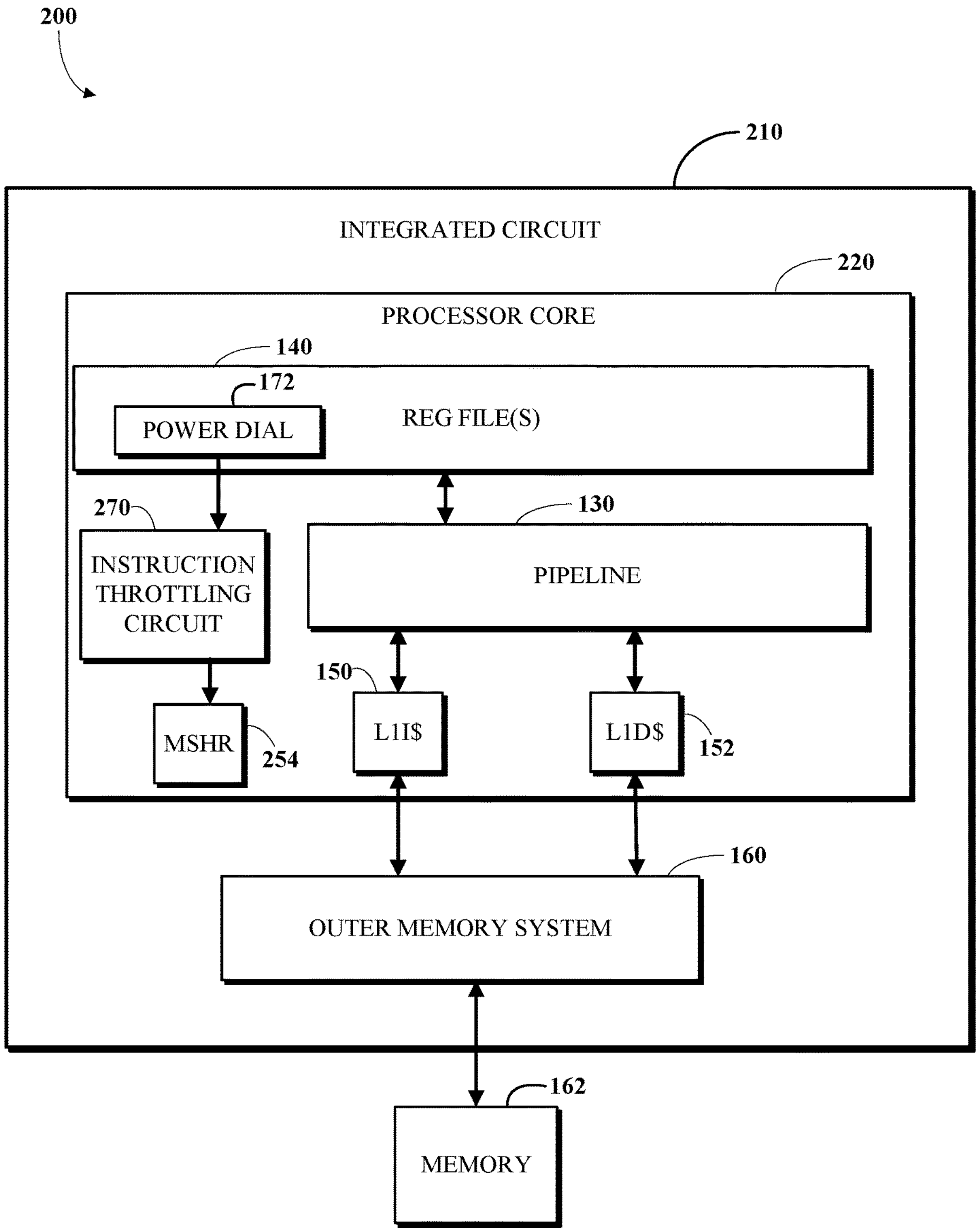
FIG. 2 is block diagram of an example of a system for executing instructions with processor power management using instruction throttling.

FIG. 2 is block diagram of an example of a system 200 for executing instructions with processor power management using instruction throttling. The system 200 includes an integrated circuit 210 (e.g., a processor or microcontroller) for executing instructions. The integrated circuit 210 includes a processor core 220 including the processor pipeline 130 configured to execute instructions. The processor core 220 includes the one or more register files 140 that include the register 172 configured to store a power dial value that indicates a portion of available clock cycles for throttling of instruction flow through the processor pipeline 130. The processor core 220 includes the L1 instruction cache 150 and the L1 data cache 152. The processor core 220 includes a set of miss status holding registers 254 that are each configured to store data describing a pending miss in a level-one cache (e.g., the L1 instruction cache 150 and/or the L1 data cache 152). The integrated circuit 210 includes the outer memory system 160, which may include memory storing instructions and data and/or provide access to the memory 162 external to the integrated circuit 210 that stores instructions and/or data. The processor core 220 includes an instruction throttling circuit 270, which may be configured to periodically stall update of miss status holding registers in the set of miss status holding registers 254 for a number of clock cycles that is determined based on the power dial value. The integrated circuit 210 may provide advantages over conventional processor architectures, such as, for example, enabling dynamic adjustment of a limit on power consumption and/or conservation of power consumption. For example, the integrated circuit 210 may implement the technique 500 of FIG. 5.

The integrated circuit 210 includes a processor core 220 including the processor pipeline 130 configured to execute instructions. The integrated circuit 210 includes a level-one cache (e.g., the L1 instruction cache 150 and the L1 data cache 152) configured to store data passing between the processor pipeline 130 and the outer memory system 160.

The integrated circuit 210 includes a set of miss status holding registers 254 that are each configured to store data describing a pending miss in the level-one cache. For example, the processor pipeline 130 may be stalled when a cache miss occurs and there is no miss status holding register available in the set of miss status holding registers 254. For example, the level-one cache may be a data cache (e.g., the L1 data cache 152). For example, the level-one cache may be an instruction cache (e.g., the L1 instruction cache 150).

The integrated circuit 210 includes an instruction throttling circuit 270 configured to periodically stall update of miss status holding registers in the set of miss status holding registers 254 for a number of clock cycles that is determined based on the power dial value, which is stored in the register 172. In some implementations, the instruction throttling circuit 270 may be part of the L1 instruction cache 150 and/or the L1 data cache 152. In some implementations, the number of clock cycles may be determined as a portion clock cycles per period of time (e.g., per 128-cycle period). For example, a power dial value of 2, where the register 172 is configured to store a three bit power dial value, may restrict instruction throughput in the processor pipeline 130 by stalling updates of the miss status holding registers in the set of miss status holding registers 254 during 32 cycles (i.e., 128*2/(2^3)) of each 128-cycle period. For example, stalling updates of the miss status holding registers in the set of miss status holding registers 254 may include preventing access to data or instructions needed in a stage of the processor pipeline 130 that accesses data through the level-one cache. Reducing the rate of instruction throughput in the processor pipeline 130 may reduce the worst case power consumption while minimizing the impact on performance. Power is a function of many variables including voltage, frequency, pipeline execution and data, therefore the instruction throttling controlled by the register 172 may be combined with other mechanisms (e.g., clock rate adjustment and/or voltage level adjustment) as elements of a power management solution.

Figure 3:
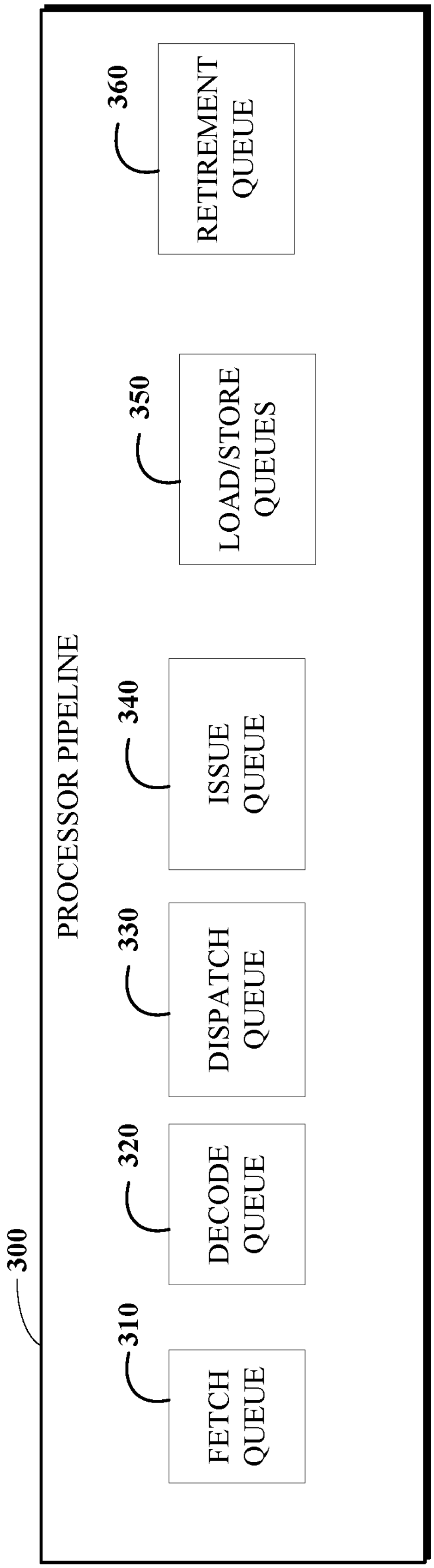
FIG. 3 is block diagram of an example of a processor pipeline including queues that can be used as stall points for instruction throttling.

FIG. 3 is block diagram of an example of a processor pipeline 300 including queues that can be used as stall points for instruction throttling. The processor pipeline 300 includes a fetch queue 310 in a fetch stage of the processor pipeline 300. The processor pipeline 300 includes a decode queue 320 in a decode stage of the processor pipeline 300. The processor pipeline 300 includes a dispatch queue 330 in a dispatch stage of the processor pipeline 300. The processor pipeline 300 includes an issue queue 340 in an issue stage of the processor pipeline 300. The processor pipeline 300 includes one or more queues 350 in a load-store unit of an execution stage of the processor pipeline 300. The processor pipeline 300 includes a retirement queue 360 (e.g., a commit buffer or a reorder buffer) in a retire stage of the processor pipeline 300. Stalling the removal of instructions from any of these queues may limit the flow of instructions through the processor pipeline 300. This stalling may create downstream bubbles of idleness in the processor pipeline 300 that may reduce power consumption as the older instructions in the downstream stages of the processor pipeline 300 are completed. This stalling may also cause the stalled queue to fill up and create idleness upstream in the processor pipeline 300 as upstream stages backup pressure and have their queues fill in turn. This backup may reduce performance of a processor core (e.g., the processor core 120) that includes the processor pipeline 300.

In some implementations, better response time to dynamic control of power consumption using instruction throttling may be achieved as throttle logic is applied closer to end of the processor pipeline 310 (e.g., in the issue stage or in the retirement stage).

Figure 4:
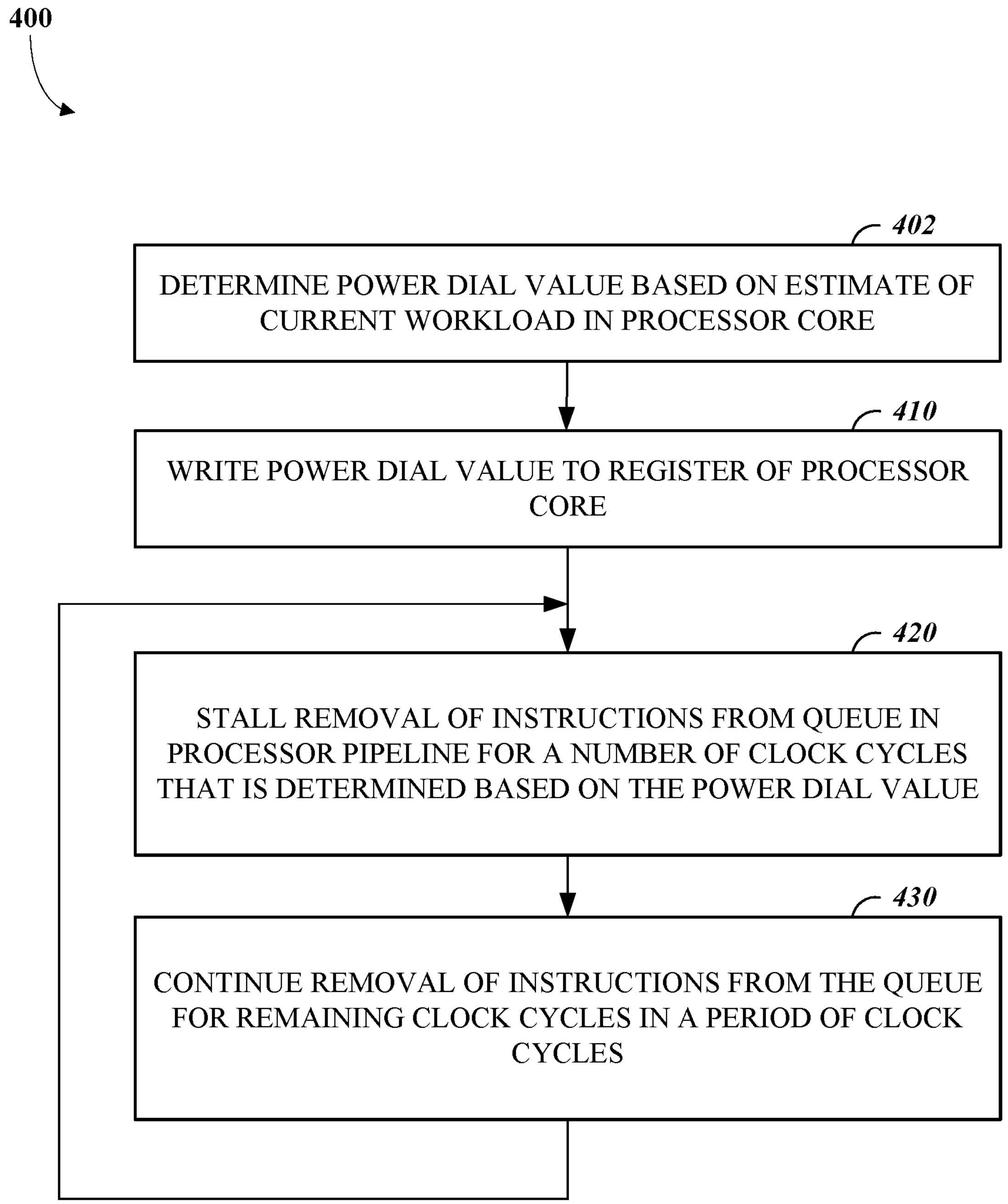
FIG. 4 is flow chart of an example of a technique for executing instructions with processor power management using instruction throttling.

FIG. 4 is flow chart of an example of a technique 400 for executing instructions with processor power management using instruction throttling. The technique 400 includes determining 402 a power dial value based on an estimate of current workload in a processor core including a processor pipeline configured to execute instructions; and writing 410 the power dial value to a register of the processor core. The technique 400 includes stalling 420 removal of instructions from a queue in the processor pipeline for a number of clock cycles that is determined based on the power dial value. The number of clock cycles may correspond to a portion of a period of clock cycles, and the technique 400 includes continuing 430 removal of instructions from a queue in the processor pipeline for remaining clock cycles in the period of clock cycles. The technique 400 may repeat a pattern of stalling 420 and continuing 430 removal of instructions from a queue in the processor pipeline for multiple periods of clock cycles to limit a peak instruction throughput rate in the processor pipeline (e.g., the processor pipeline 300). The technique 400 may provide advantages over conventional techniques, such as, for example, enabling dynamic adjustment of a limit on power consumption and/or conservation of power consumption. For example, the technique 400 may be implemented using the integrated circuit 110 of FIG. 1.

The technique 400 includes determining 402 the power dial value based on an estimate of current workload in the processor core (e.g., the processor core 120). For example, software may be used to read a system clock at check points in a set of instructions and the differences in timestamps from the system clock between checkpoints may be used to estimate instruction throughput and/or workload of processor core. The power dial value may be determined 402 to dynamically adjust the tradeoff between power consumption and performance in response to changing conditions and demand for processor bandwidth on the processor core.

The technique 400 includes writing 410 a power dial value to a register (e.g., the register 172) of a processor core including a processor pipeline (e.g., the processor pipeline 130) configured to execute instructions. The power dial value may indicate a portion of available clock cycles for throttling of instruction flow through the processor pipeline. For example, a certain privilege mode (e.g., a machine mode) may be required to have write access to the register. For example, the register may be part of a register file in the processor core. For example, the register may include a bit field of four bits (e.g., bits 3:0, with bits 31:4 reserved) that indicates a portion (e.g., n/16, where n is the value written to the register) of available clock cycles for throttling of instruction flow through the processor pipeline. In some implementations, writing 410 a non-zero value to the register may restrict peak instruction throughput to an indicated rate. For example, a value of 0 may have no effect on instruction throughput. In some implementations, the rate may be calculated in terms of a portion clock cycles per period of time (e.g., per 256-cycle period). For example, a power dial value of 2 may restrict instruction throughput at a common point (e.g., a stall point) in the processor pipeline to 224 cycles of each 256-cycle period by stalling instruction flow during 32 cycles of each 256-cycle period.

The technique 400 includes stalling 420 removal of instructions from a queue in the processor pipeline for a number of clock cycles that is determined based on the power dial value. The queue may correspond to one of various potential stall points in the processor pipeline (e.g., the processor pipeline 300). For example, the queue may be a fetch queue in a fetch stage of the processor pipeline. For example, the queue may be a decode queue in a decode stage of the processor pipeline. For example, the queue may be a dispatch queue in a dispatch stage of the processor pipeline. For example, the queue may be an issue queue in an issue stage of the processor pipeline. For example, the queue may be in a load-store unit of an execution stage of the processor pipeline. For example, the queue may be a retirement queue (e.g., a commit buffer or a reorder buffer) in a retire stage of the processor pipeline. In some implementations, better response time to dynamic control of power consumption using instruction throttling may be achieved as throttle logic is applied closer to end of the processor pipeline (e.g., in an issue stage or in a retirement stage). In some implementations, the number of clock cycles may be determined as a portion clock cycles per period of time (e.g., per 256-cycle period). For example, a power dial value of 3, where the register is configured to store a four bit power dial value, may restrict instruction throughput at the output of the queue in the processor pipeline to 208 cycles of each 256-cycle period by stalling instruction flow during 48 cycles (i.e., 256*3/(2^4)) of each 256-cycle period. For example, stalling removal of instructions from a queue in the processor pipeline may include disabling processing in a stage of the processor pipeline that draws instructions from the queue.

The technique 400 includes continuing 430 removal of instructions from the queue in the processor pipeline for remaining clock cycles of a period of clock cycles (e.g., a 128-cycle period or a 256-cycle period). While the instructions are continuing 430 to be removed from the queue, instructions may flow unobstructed through the processor pipeline. The technique 400 may repeat a pattern of stalling 420 and continuing 430 removal of instructions from the queue in the processor pipeline for multiple periods of clock cycles to limit a peak instruction throughput rate in the processor pipeline (e.g., the processor pipeline 300). For example, periodic stalling 420 of removal of instructions from the queue in the processor pipeline may be maintained until the register (e.g., the register 172) is written with a new power dial value or the processor core is reset. Reducing the peak rate of instruction throughput in the processor pipeline may reduce the worst case power consumption while minimizing the impact on performance. Power is a function of many variables including voltage, frequency, pipeline execution and data, therefore the instruction throttling controlled by the register may be combined with other mechanisms (e.g., clock rate adjustment and/or voltage level adjustment) as elements of a power management solution.

For simplicity of explanation, the techniques 400 and 500 are depicted and described herein as a series of steps or operations. However, not all of the illustrated steps or operations may be required to implement the technique 400 in accordance with the disclosed subject matter. For example, the step 402 may be omitted in some implementations or replaced by a determination of the power dial value based on other considerations, such as, for example, a battery change level indication, time of day, or user input. Additionally, other steps or operations not presented and described herein may be used. For example, a voltage level used by the integrated circuit may also be dynamically adjusted to control power consumption.

Figure 5:
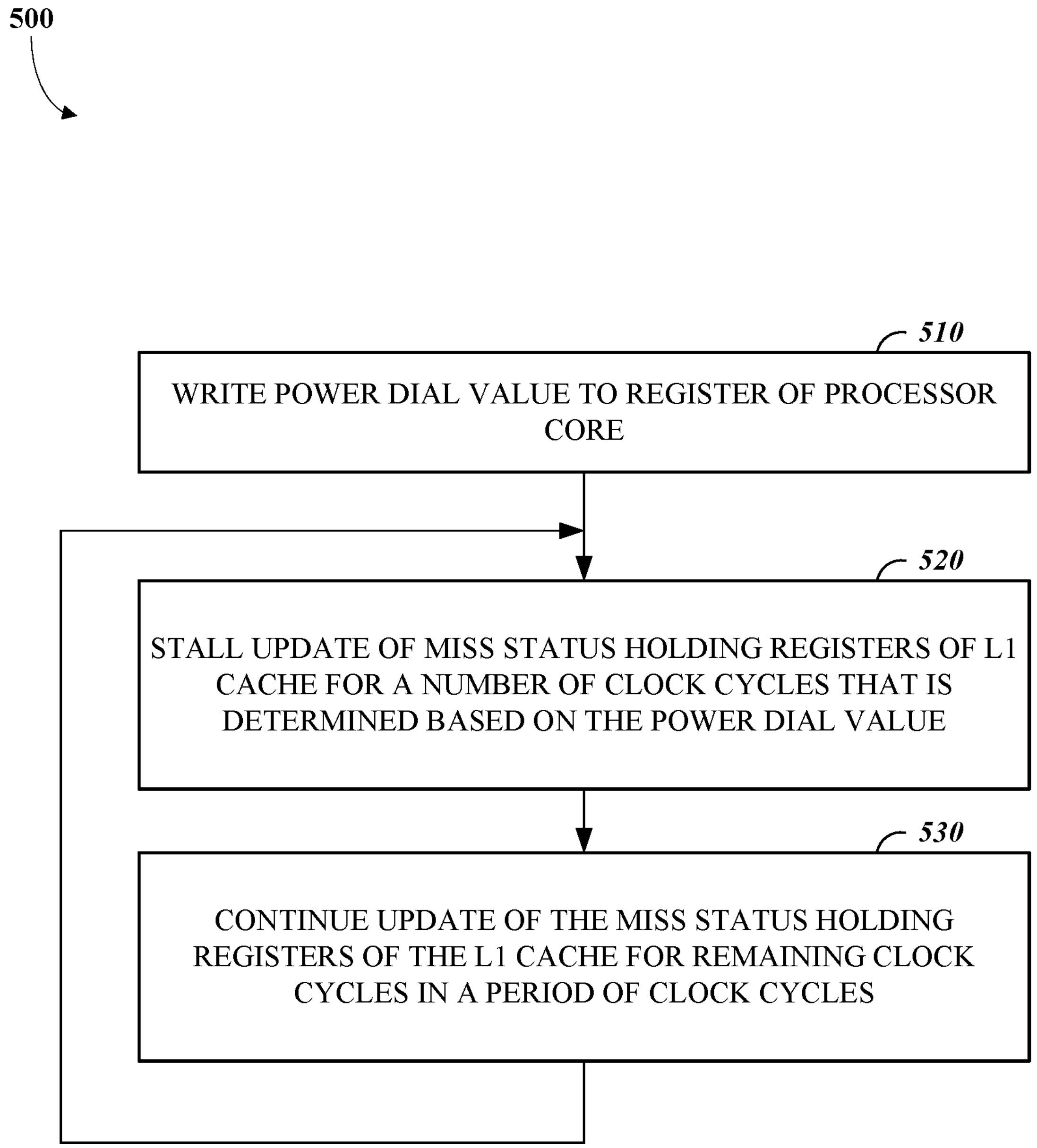
FIG. 5 is flow chart of an example of a technique for executing instructions with processor power management using instruction throttling.

FIG. 5 is flow chart of an example of a technique 500 for executing instructions with processor power management using instruction throttling. The technique 500 includes writing 510 a power dial value to a register of the processor core. The technique 500 includes stalling 520 update of miss status holding registers in a set of miss status holding registers of a level-one cache for a number of clock cycles that is determined based on the power dial value. The number of clock cycles may correspond to a portion of a period of clock cycles, and the technique 500 includes continuing 530 update of miss status holding registers in the set of miss status holding registers for remaining clock cycles in the period of clock cycles. The technique 500 may repeat a pattern of stalling 520 and continuing 530 update of miss status holding registers in the set of miss status holding registers for multiple periods of clock cycles to limit a peak instruction throughput rate in the processor pipeline (e.g., the processor pipeline 130). The technique 500 may provide advantages over conventional techniques, such as, for example, enabling dynamic adjustment of a limit on power consumption and/or conservation of power consumption. For example, the technique 500 may be implemented using the integrated circuit 210 of FIG. 2.

The technique 500 includes writing 510 a power dial value to a register (e.g., the register 172) of a processor core including a processor pipeline (e.g., the processor pipeline 130) configured to execute instructions. The power dial value may indicate a portion of available clock cycles for throttling of instruction flow through the processor pipeline. For example, a certain privilege mode (e.g., a machine mode) may be required to have write access to the register. For example, the register may be part of a register file in the processor core. For example, the register may include a bit field of four bits (e.g., bits 3:0, with bits 31:4 reserved) that indicates a portion (e.g., n/16, where n is the value written to the register) of available clock cycles for throttling of instruction flow through the processor pipeline. In some implementations, the rate may be calculated in terms of a portion clock cycles per period of time (e.g., per 64-cycle period). For example, a power dial value of 2 may restrict instruction throughput in the processor pipeline by stalling updates of the miss status holding registers in the set of miss status holding registers during 8 cycles (i.e., 64*2/(2^4)) of each 64-cycle period.

The technique 500 includes stalling 520 update of miss status holding registers in a set of miss status holding registers (e.g., the set of miss status holding registers 254) of a level-one cache for a number of clock cycles that is determined based on the power dial value. For example, the level-one cache may be a data cache (e.g., the L1 data cache 152). For example, the level-one cache may be an instruction cache (e.g., the L1 instruction cache 150). In some implementations, the number of clock cycles may be determined as a portion clock cycles per period of time (e.g., per 512-cycle period). For example, a power dial value of 5, where the register is configured to store a five bit power dial value, may restrict instruction throughput in the processor pipeline by stalling updates of the miss status holding registers in the set of miss status holding registers during 80 cycles (i.e., 512*5/(2^5)) of each 512-cycle period. For example, stalling updates of the miss status holding registers in the set of miss status holding registers may include preventing access to data or instructions needed in a stage of the processor pipeline that accesses data through the level-one cache.

The technique 500 includes continuing 530 update of miss status holding registers in the set of miss status holding registers for remaining clock cycles of a period of clock cycles (e.g., a 128-cycle period or a 256-cycle period). While the miss status holding registers are continuing 530 to be updated, instructions may flow unobstructed through the processor pipeline. The technique 500 may repeat a pattern of stalling 520 and continuing 530 update of miss status holding registers in the set of miss status holding registers for multiple periods of clock cycles to limit a peak instruction throughput rate in the processor pipeline (e.g., the processor pipeline 300). For example, periodic stalling 520 of update of miss status holding registers in the set of miss status holding registers may be maintained until the register (e.g., the register 172) is written with a new power dial value or the processor core is reset. Reducing the peak rate of instruction throughput in the processor pipeline may reduce the worst case power consumption while minimizing the impact on performance. Power is a function of many variables including voltage, frequency, pipeline execution and data, therefore the instruction throttling controlled by the register may be combined with other mechanisms (e.g., clock rate adjustment and/or voltage level adjustment) as elements of a power management solution.

Figure 6:
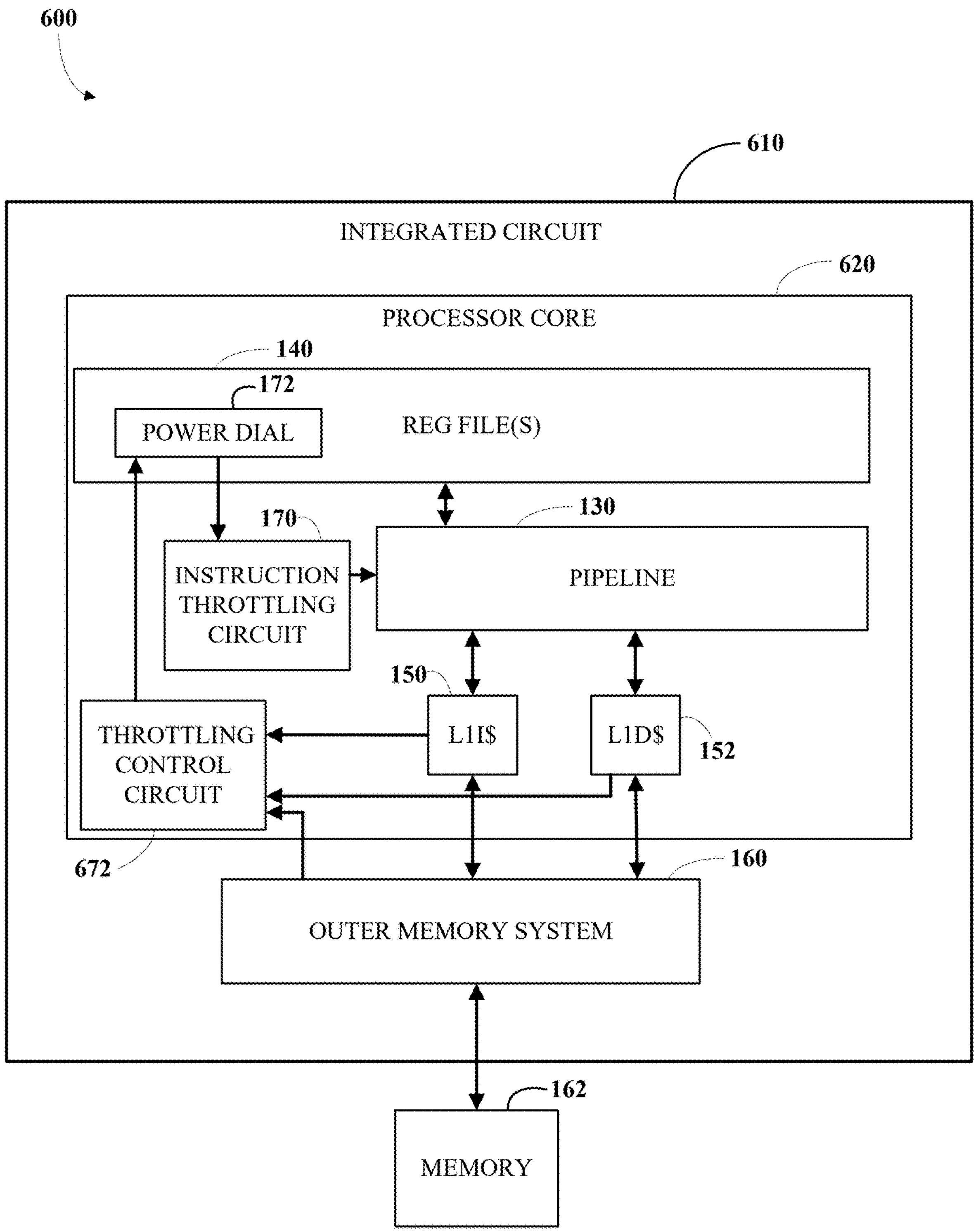
FIG. 6 is block diagram of an example of a system for executing instructions with processor power management using instruction throttling that is controlled based on cache misses.

FIG. 6 is block diagram of an example of a system 600 for executing instructions with processor power management using instruction throttling that is controlled based on cache misses. The system 600 includes an integrated circuit 610 (e.g., a processor or microcontroller) for executing instructions. The integrated circuit 610 includes a processor core 620 including a processor pipeline 130 configured to execute instructions. The processor core 620 includes one or more register files 140 that include a register 172 configured to store a power dial value that indicates a portion of available clock cycles for throttling of instruction flow through the processor pipeline 130. The processor core 620 includes an L1 instruction cache 150 and an L1 data cache 152. The integrated circuit 610 includes an outer memory system 160, which may include memory storing instructions and data and/or provide access to a memory 162 external to the integrated circuit 610 that stores instructions and/or data. The processor core 620 includes an instruction throttling circuit 170, which may be configured to periodically stall removal of instructions from a queue in the processor pipeline 130 for a number of clock cycles that is determined based on the power dial value. The processor core 620 includes a throttling control circuit 672 configured to determine the power dial value based on a cache miss and store the power dial value in the register 172. The integrated circuit 610 may provide advantages over conventional processor architectures, such as, for example, enabling dynamic adjustment of a limit on power consumption and/or conservation of power consumption. For example, the integrated circuit 610 may implement the technique 400 of FIG. 4. For example, the integrated circuit 610 may implement the technique 700 of FIG. 7.

The integrated circuit 610 includes a processor core 620 including a processor pipeline 130 configured to execute instructions. The processor pipeline 130 may include one or more fetch stages that are configured to retrieve instructions from a memory system of the integrated circuit 610. For example, the processor pipeline 130 may fetch instructions via the L1 instruction cache 150. For example, the processor pipeline 130 may include the processor pipeline 300 of FIG. 3. The processor pipeline 130 may include additional stages, such as decode, rename, dispatch, issue, execute, memory access, and write-back stages. For example, the processor pipeline 130 may be configured to execute instructions of a RISC V instruction set.

The integrated circuit 610 includes a register 172 configured to store a power dial value that indicates a portion of available clock cycles for throttling of instruction flow through the processor pipeline 130. In this example, the register 172 is part of a register file 140 in the processor core 620. For example, the register 172 may have write access limited to processes of a certain privilege mode (e.g., a machine mode). When written to a non-zero value, the register 172 may restrict peak instruction throughput to an indicated rate. For example, the register 172 may include a bit field of four bits (e.g., bits 3:0, with bits 31:4 reserved) that indicates a portion (e.g., n/16, where n is the value written to the register 172) of available clock cycles for throttling of instruction flow through the processor pipeline 130. For example, a value of 0 has no effect on instruction throughput. In some implementations, the rate may be calculated in terms of a portion clock cycles per period of time (e.g., per 256-cycle period). For example, a power dial value of 1 may restrict instruction throughput at a common point (e.g., a stall point) in the processor pipeline 130 to 240 cycles of each 256-cycle period by stalling instruction flow during 16 cycles of each 256-cycle period.

The integrated circuit 610 includes an L1 instruction cache 150 for the processor core 620. The L1 instruction cache 150 may be a set-associative cache for instruction memory. To avoid the long latency of reading a tag array and a data array in series, and the high power of reading the arrays in parallel, a way predictor may be used. The way predictor may be accessed in an early fetch stage and the hit way may be encoded into the read index of the data array. The tag array may be accessed in later fetch stage and is only used for verifying the way predictor.

The integrated circuit 610 includes an L1 data cache 152 for the processor core 620. For example, the L1 data cache 152 may be a set-associative VIPT cache, meaning that it is indexed purely with virtual address bits VA[set] and tagged fully with all translate physical address bits PA[msb:12]. For low power consumption, the tag and data arrays may be looked up in serial so that at most a single data SRAM way is accessed. For example, the line size of the L1 data cache 152 may be 64 Bytes, and the beat size may be 16 Bytes.

The integrated circuit 610 includes an outer memory system 160, which may include memory storing instructions and data and/or provide access to a memory 162 external to the integrated circuit that stores instructions and/or data. For example, the outer memory system 160 may include an L2 cache, which may be configured to implement a cache coherency protocol/policy to maintain cache coherency across multiple L1 caches. Although not shown in FIG. 1, the integrated circuit 610 may include multiple processor cores in some implementations. For example, the outer memory system 160 may include multiple layers.

The integrated circuit 610 includes an instruction throttling circuit 170 configured to periodically stall removal of instructions from a queue in the processor pipeline 130 for a number of clock cycles that is determined based on the power dial value, which is stored in the register 172. The queue may correspond to one of various potential stall points in the processor pipeline 130. For example, the queue may be a fetch queue in a fetch stage of the processor pipeline 130. For example, the queue may be a decode queue in a decode stage of the processor pipeline 130. For example, the queue may be a dispatch queue in a dispatch stage of the processor pipeline 130. For example, the queue may be an issue queue in an issue stage of the processor pipeline 130. For example, the queue may be in a load-store unit of an execution stage of the processor pipeline 130. For example, the queue may be a retirement queue (e.g., a commit buffer or a reorder buffer) in a retire stage of the processor pipeline 130. In some implementations, better response time to dynamic control of power consumption using instruction throttling may be achieved as throttle logic is applied closer to end of the processor pipeline 130 (e.g., in an issue stage or in a retirement stage). In some implementations, the instruction throttling circuit 170 may be part of the processor pipeline 130. In some implementations, the number of clock cycles may be determined as a portion clock cycles per period of time (e.g., per 256-cycle period). For example, a power dial value of 3, where the register 172 is configured to store a five bit power dial value, may restrict instruction throughput at the output of the queue in the processor pipeline 130 to 232 cycles of each 256-cycle period by stalling instruction flow during 24 cycles (i.e., 256*3/(2^5)) of each 256-cycle period. For example, stalling removal of instructions from a queue in the processor pipeline 130 may include disabling processing in a stage of the processor pipeline 130 that draws instructions from the queue. Reducing the peak rate of instruction throughput in the processor pipeline 130 may reduce the worst case power consumption while minimizing the impact on performance. Power is a function of many variables including voltage, frequency, pipeline execution and data, therefore the instruction throttling controlled by the register 172 may be combined with other mechanisms (e.g., clock rate adjustment and/or voltage level adjustment) as elements of a power management solution.

The integrated circuit 610 includes a throttling control circuit 672 configured to determine the power dial value based on a cache miss and store the power dial value in the register 172. In some implementations, the power dial value may be determined to be proportional to a level of a cache in which the cache miss occurred. For example, if we have a last-level cache miss, we can set the power dial value to 14 out of 15 (e.g., a generally high throttle). If we get an L1 cache miss, the throttle value can be set to a lower value, such as 2 out of 15 (e.g., a generally low throttle). The throttling control circuit 672 may receive signals indicating cache misses from the L1 instruction cache 150, the L1 data cache 152, and/or other caches in the outer memory system 160. Similar logic may be used to determine a power dial value based on other events in a processor core, such as a translation lookaside buffer (TLB) miss. In some implementations (not shown in FIG. 6), the throttling control circuit 672 configured to determine the power dial value based on a TLB miss and store the power dial value in the register 172.

The logic of the throttling control circuit 672 may also be employed in the integrated circuit 200 of FIG. 2 to determine the power dial value based on a cache miss, a TLB miss, or some other event on the processor core 220.

Figure 7:
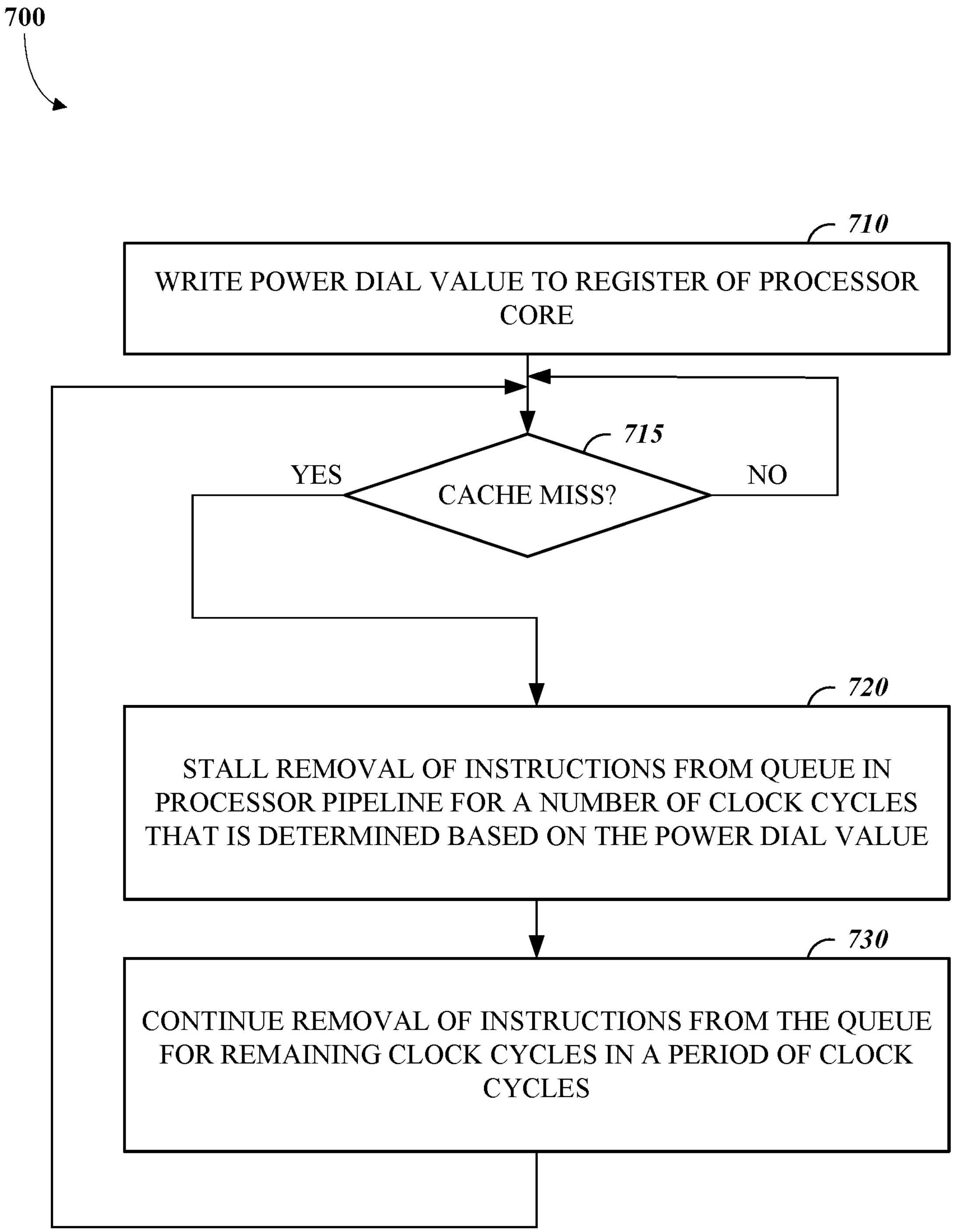
FIG. 7 is flow chart of an example of a technique for executing instructions with processor power management using instruction throttling responsive to cache misses.

FIG. 7 is flow chart of an example of a technique 700 for executing instructions with processor power management using instruction throttling responsive to cache misses. The technique 700 includes writing 710 the power dial value to a register of the processor core. At 715, if a cache miss is active, then the technique 700 includes stalling 720 removal of instructions from a queue in the processor pipeline for a number of clock cycles that is determined based on the power dial value responsive to an active cache miss. The number of clock cycles may correspond to a portion of a period of clock cycles, and the technique 700 includes continuing 730 removal of instructions from a queue in the processor pipeline for remaining clock cycles in the period of clock cycles. The technique 700 may repeat a pattern of stalling 720 and continuing 730 removal of instructions from a queue in the processor pipeline for multiple periods of clock cycles to limit a peak instruction throughput rate in the processor pipeline (e.g., the processor pipeline 300) while, at 715, a cache miss is active. The technique 700 may provide advantages over conventional techniques, such as, for example, enabling dynamic adjustment of a limit on power consumption and/or conservation of power consumption. For example, the technique 700 may be implemented using the integrated circuit 110 of FIG. 1. For example, the technique 700 may be implemented using the integrated circuit 610 of FIG. 6.

The technique 700 includes writing 710 a power dial value to a register (e.g., the register 172) of a processor core including a processor pipeline (e.g., the processor pipeline 130) configured to execute instructions. The power dial value may indicate a portion of available clock cycles for throttling of instruction flow through the processor pipeline. For example, a certain privilege mode (e.g., a machine mode) may be required to have write access to the register. For example, the register may be part of a register file in the processor core. For example, the register may include a bit field of four bits (e.g., bits 3:0, with bits 31:4 reserved) that indicates a portion (e.g., n/16, where n is the value written to the register) of available clock cycles for throttling of instruction flow through the processor pipeline. In some implementations, writing 710 a non-zero value to the register may restrict peak instruction throughput to an indicated rate. For example, a value of 0 may have no effect on instruction throughput. In some implementations, the rate may be calculated in terms of a portion clock cycles per period of time (e.g., per 256-cycle period). For example, a power dial value of 2 may restrict instruction throughput at a common point (e.g., a stall point) in the processor pipeline to 224 cycles of each 256-cycle period by stalling instruction flow during 32 cycles of each 256-cycle period. In some implementations, the technique 700 includes determining the power dial value based on a level of a cache in which the cache miss occurred. For example, if we have a last-level cache miss, we can set the power dial value to 14 out of 15 (e.g., a generally high throttle). If we get an L1 cache miss, the throttle value can be set to a lower value, such as 2 out of 15 (e.g., a generally low throttle).

At 715, if a cache miss is active, then the technique 700 includes stalling 720 removal of instructions from a queue in the processor pipeline for a number of clock cycles that is determined based on the power dial value responsive to an active cache miss. The queue may correspond to one of various potential stall points in the processor pipeline (e.g., the processor pipeline 300). For example, the queue may be a fetch queue in a fetch stage of the processor pipeline. For example, the queue may be a decode queue in a decode stage of the processor pipeline. For example, the queue may be a dispatch queue in a dispatch stage of the processor pipeline. For example, the queue may be an issue queue in an issue stage of the processor pipeline. For example, the queue may be in a load-store unit of an execution stage of the processor pipeline. For example, the queue may be a retirement queue (e.g., a commit buffer or a reorder buffer) in a retire stage of the processor pipeline. In some implementations, better response time to dynamic control of power consumption using instruction throttling may be achieved as throttle logic is applied closer to end of the processor pipeline (e.g., in an issue stage or in a retirement stage). In some implementations, the number of clock cycles may be determined as a portion clock cycles per period of time (e.g., per 256-cycle period). For example, a power dial value of 3, where the register is configured to store a four bit power dial value, may restrict instruction throughput at the output of the queue in the processor pipeline to 208 cycles of each 256-cycle period by stalling instruction flow during 78 cycles (i.e., 256*3/(2^4)) of each 256-cycle period. For example, stalling removal of instructions from a queue in the processor pipeline may include disabling processing in a stage of the processor pipeline that draws instructions from the queue.

The technique 700 includes continuing 730 removal of instructions from the queue in the processor pipeline for remaining clock cycles of a period of clock cycles (e.g., a 128-cycle period or a 256-cycle period). While the instructions are continuing 730 to be removed from the queue, instructions may flow unobstructed through the processor pipeline. The technique 700 may repeat a pattern of stalling 720 and continuing 730 removal of instructions from the queue in the processor pipeline for multiple periods of clock cycles to limit a peak instruction throughput rate in the processor pipeline (e.g., the processor pipeline 300). For example, periodic stalling 720 of removal of instructions from the queue in the processor pipeline may be maintained until the register (e.g., the register 172) is written with a new power dial value or the processor core is reset. Reducing the peak rate of instruction throughput in the processor pipeline may reduce the worst case power consumption while minimizing the impact on performance. Power is a function of many variables including voltage, frequency, pipeline execution and data, therefore the instruction throttling controlled by the register may be combined with other mechanisms (e.g., clock rate adjustment and/or voltage level adjustment) as elements of a power management solution.

In some implementations (not shown in FIG. 7), this approach of applying instruction throttling contingent on a cache miss occurring may be generalized to other events in a processor core, such as a TLB miss. For example, stalling 720 removal of instructions from the queue in the processor pipeline may be responsive to an active translation lookaside buffer miss.

In a first aspect, the subject matter described in this specification can be embodied in integrated circuit for executing instructions that includes a processor core including a processor pipeline configured to execute instructions; a register configured to store a power dial value that indicates a portion of available clock cycles for throttling of instruction flow through the processor pipeline; and an instruction throttling circuit configured to periodically stall removal of instructions from a queue in the processor pipeline for a number of clock cycles that is determined based on the power dial value.

In the first aspect, the queue may be a fetch queue in a fetch stage of the processor pipeline. In the first aspect, the queue may be a decode queue in a decode stage of the processor pipeline. In the first aspect, the queue may be a dispatch queue in a dispatch stage of the processor pipeline. In the first aspect, the queue may be an issue queue in an issue stage of the processor pipeline. In the first aspect, the queue may be in a load-store unit of an execution stage of the processor pipeline. In the first aspect, the queue may be a retirement queue in a retire stage of the processor pipeline. In the first aspect, the register may be part of a register file in the processor core. In the first aspect, the integrated circuit may include a throttling control circuit configured to determine the power dial value based on a cache miss and store the power dial value in the register. In the first aspect, the power dial value may be determined to be proportional to a level of a cache in which the cache miss occurred.

In a second aspect, the subject matter described in this specification can be embodied in methods that include writing a power dial value to a register of a processor core including a processor pipeline configured to execute instructions, wherein the power dial value that indicates a portion of available clock cycles for throttling of instruction flow through the processor pipeline; and stalling removal of instructions from a queue in the processor pipeline for a number of clock cycles that is determined based on the power dial value.

In the second aspect, the queue may be a fetch queue in a fetch stage of the processor pipeline. In the second aspect, the queue may be a decode queue in a decode stage of the processor pipeline. In the second aspect, the queue may be a dispatch queue in a dispatch stage of the processor pipeline. In the second aspect, the queue may be an issue queue in an issue stage of the processor pipeline. In the second aspect, the queue may be in a load-store unit of an execution stage of the processor pipeline. In the second aspect, the queue may be a retirement queue in a retire stage of the processor pipeline. In the second aspect, the methods may include determining the power dial value based on an estimate of current workload in the processor core. In the second aspect, the methods may include determining the power dial value based on a level of a cache in which the cache miss occurred. In the second aspect, stalling removal of instructions from the queue in the processor pipeline may be responsive to an active cache miss. In the second aspect, stalling removal of instructions from the queue in the processor pipeline may be responsive to an active translation lookaside buffer miss. In the second aspect, the register may be part of a register file in the processor core.

In a third aspect, the subject matter described in this specification can be embodied in integrated circuit for executing instructions that includes a processor core including a processor pipeline configured to execute instructions; a level-one cache configured to store data passing between the processor pipeline and an outer memory system; a set of miss status holding registers that are each configured to store data describing a pending miss in the level-one cache; a register configured to store a power dial value that indicates a portion of available clock cycles for throttling of instruction flow through the processor pipeline; and an instruction throttling circuit configured to periodically stall update of miss status holding registers in the set of miss status holding registers for a number of clock cycles that is determined based on the power dial value.

In the third aspect, the register may be part of a register file in the processor core. In the third aspect, the level-one cache may be a data cache. In the third aspect, the integrated circuit may include a throttling control circuit configured to determine the power dial value based on a cache miss and store the power dial value in the register. In the third aspect, the power dial value may be determined to be proportional to a level of a cache in which the cache miss occurred.

In a fourth aspect, the subject matter described in this specification can be embodied in methods that include writing a power dial value to a register of a processor core including a processor pipeline configured to execute instructions, wherein the power dial value that indicates a portion of available clock cycles for throttling of instruction flow through the processor pipeline; and stalling update of miss status holding registers in the set of miss status holding registers of a level-one cache for a number of clock cycles that is determined based on the power dial value.

In the fourth aspect, the register may be part of a register file in the processor core. In the fourth aspect, the level-one cache may be a data cache. In the fourth aspect, the methods may include determining the power dial value based on a cache miss and storing the power dial value in the register. In the fourth aspect, the power dial value may be determined to be proportional to a level of a cache in which the cache miss occurred.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:

a processor core including a processor pipeline configured to execute instructions;

a register configured to store a power dial value that indicates a portion of available clock cycles for throttling of instruction flow through the processor pipeline;

a throttling control circuit configured to determine the power dial value based on a cache miss and a level of a cache in which the cache miss occurred, and store the power dial value in the register; and an instruction throttling circuit configured to, responsive to an active cache miss, periodically stall removal of instructions from a queue in the processor pipeline for a number of clock cycles that is determined based on the power dial value.

2. The integrated circuit of claim 1, in which the register is part of a register file in the processor core.

3. The integrated circuit of claim 1, in which the queue is a fetch queue in a fetch stage of the processor pipeline.

4. The integrated circuit of claim 1, in which the queue is a decode queue in a decode stage of the processor pipeline.

5. The integrated circuit of claim 1, in which the queue is a dispatch queue in a dispatch stage of the processor pipeline.

6. The integrated circuit of claim 1, in which the queue is an issue queue in an issue stage of the processor pipeline.

7. The integrated circuit of claim 1, in which the queue is in a load-store unit of an execution stage of the processor pipeline.

8. The integrated circuit of claim 1, in which the queue is a retirement queue in a retire stage of the processor pipeline.

9. The integrated circuit of claim 1, in which the power dial value is determined to be proportional to the level of the cache in which the cache miss occurred.

10. A method comprising:

determining, by a throttling control circuit, a power dial value based on a cache miss and a level of a cache in which the cache miss occurred;

writing, by the throttling control circuit, the power dial value to a register of a processor core including a processor pipeline configured to execute instructions, wherein the power dial value indicates a portion of available clock cycles for throttling of instruction flow through the processor pipeline; and responsive to an active cache miss, stalling removal of instructions from a queue in the processor pipeline for a number of clock cycles that is determined based on the power dial value.

11. The method of claim 10, wherein determining the power dial value is further based on an estimate of current workload in the processor core.

12. The method of claim 10, in which stalling removal of instructions from the queue in the processor pipeline is responsive to an active translation lookaside buffer miss.

13. The method of claim 10, in which the queue is a decode queue in a decode stage of the processor pipeline.

14. The method of claim 10, in which the queue is a dispatch queue in a dispatch stage of the processor pipeline.

15. An integrated circuit for executing instructions comprising:

a processor core including a processor pipeline configured to execute instructions;

a level-one cache configured to store data passing between the processor pipeline and an outer memory system;

a set of miss status holding registers that are each configured to store data describing a pending miss in the level-one cache;

a register configured to store a power dial value that indicates a portion of available clock cycles for throttling of instruction flow through the processor pipeline;

a throttling control circuit configured to determine the power dial value based on a cache miss and store the power dial value in the register; and an instruction throttling circuit configured to periodically stall update of miss status holding registers in the set of miss status holding registers for a number of clock cycles that is determined based on the power dial value.

16. The integrated circuit of claim 15, in which the power dial value is determined to be proportional to a level of a cache in which the cache miss occurred.

* * * * *